(12) United States Patent
Finkenzeller et al.

(10) Patent No.: US 11,449,858 B2
(45) Date of Patent: *Sep. 20, 2022

(54) MANAGEMENT, AUTHENTICATION AND ACTIVATION OF A DATA CARRIER

(71) Applicant: GIESECKE+DEVRIENT MOBILE SECURITY GMBH, Munich (DE)

(72) Inventors: Klaus Finkenzeller, Unterföhring (DE); Stephan Rasch, Unterföhring (DE); Dirk Riesenbeck, Vaterstetten (DE); Hans-Jürgen Roth, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 39 days.

This patent is subject to a terminal disclaimer.

(21) Appl. No.: 15/754,846

(22) PCT Filed: Aug. 22, 2016

(86) PCT No.: PCT/EP2016/001419
§ 371 (c)(1),
(2) Date: Feb. 23, 2018

(87) PCT Pub. No.: WO2017/032453
PCT Pub. Date: Mar. 2, 2017

(65) Prior Publication Data
US 2018/0240102 A1    Aug. 23, 2018

(30) Foreign Application Priority Data
Aug. 24, 2015  (DE) .................. 102015011083.7

(51) Int. Cl.
*G06Q 20/32*   (2012.01)
*G06Q 20/34*   (2012.01)
(Continued)

(52) U.S. Cl.
CPC ..... *G06Q 20/3278* (2013.01); *G06K 17/0025* (2013.01); *G06K 19/0725* (2013.01);
(Continued)

(58) Field of Classification Search
CPC ............. G06Q 20/3278; G06Q 20/354; G06Q 20/3572; G06Q 20/382; G06Q 20/409; G06K 17/0025; G06K 19/0725
(Continued)

(56) References Cited

U.S. PATENT DOCUMENTS 9,253,617 B2 *  2/2016  Cohen .................. H04W 4/24
10,037,526 B2 *  7/2018  Campos .............. G06Q 20/40
(Continued)

FOREIGN PATENT DOCUMENTS

DE   102011115154 B3   3/2013
WO   2007136939 A2    11/2007
(Continued)

OTHER PUBLICATIONS

Hoffman et al. Securing number plates based on digital signatures and RFID, 16th International IEEE Conference on Intelligent Transportation Systems (ITSC 2013) (pp. 2051-2057) (Year: 2013).*
(Continued)

*Primary Examiner* — Hani M Kazimi
*Assistant Examiner* — Alison L. Lamb
(74) *Attorney, Agent, or Firm* — Workman Nydegger

(57) ABSTRACT

A method in a system comprising at least one portable data carrier, an authentication server and at least one reading device of at least one service provider which is couplable to the authentication server. The data carrier is adapted to communicate contactlessly with the reading device and comprises a security marking which can be read contactlessly by the reading device and on the basis of which the data carrier can be authenticated by the authentication
(Continued)

server. The method comprises the step of equipping the data carrier with a data-carrier management marking that encodes a piece of data-carrier management information and readable contactlessly by a portable terminal. The method includes contactlessly reading out the data-carrier management marking by a portable terminal, transferring the data-carrier management information encoded in the data-carrier management marking to the authentication server, and managing the data carrier in the system employing the data-carrier management information.

14 Claims, 3 Drawing Sheets

(51) Int. Cl.
    *G06Q 20/40* (2012.01)
    *G06Q 20/38* (2012.01)
    *G06K 17/00* (2006.01)
    *G06K 19/07* (2006.01)

(52) U.S. Cl.
    CPC ....... *G06Q 20/354* (2013.01); *G06Q 20/3572* (2013.01); *G06Q 20/382* (2013.01); *G06Q 20/409* (2013.01)

(58) Field of Classification Search
    USPC .......................................................... 705/40
    See application file for complete search history.

(56) References Cited

U.S. PATENT DOCUMENTS

| | | | | |
|---|---|---|---|---|
| 2008/0215887 A1* | 9/2008 | Hart | ........................ | G07F 7/086 713/172 |
| 2011/0025473 A1 | 2/2011 | Rokhsaz et al. | | |
| 2013/0183934 A1* | 7/2013 | Roemer | ................ | H04W 8/265 455/411 |
| 2013/0290121 A1* | 10/2013 | Simakov | ............ | G06Q 20/3572 705/21 |
| 2014/0279476 A1* | 9/2014 | Hua | ..................... | G06Q 20/341 705/41 |
| 2015/0302394 A1* | 10/2015 | Harper | ................... | G06Q 40/02 705/41 |
| 2017/0024945 A1* | 1/2017 | Shalev | ..................... | G07C 9/27 |

FOREIGN PATENT DOCUMENTS

| | | | | |
|---|---|---|---|---|
| WO | | 2012027664 A1 | 3/2012 | |
| WO | WO-2016037295 A1 * | | 3/2016 | ........... G06K 19/145 |

OTHER PUBLICATIONS

German Search Report from DE Application No. DE 10 2015 011 083.7, dated Jul. 18, 2016.

International Search Report from PCT Application No. PCT/EP2016/001419, dated Nov. 29, 2016.

International Preliminary Report on Patentability from PCT Application No. PCT/EP2016/001419, dated Nov. 29, 2016.

"Information Technology—Automatic Identification and Data Capture Techniques—Part 19: Crypto Suite RAMON Security Services for Air Interface Communications," ISO/IEC 29167-19, First Edition, May 15, 2016, 82 Pages.

* cited by examiner

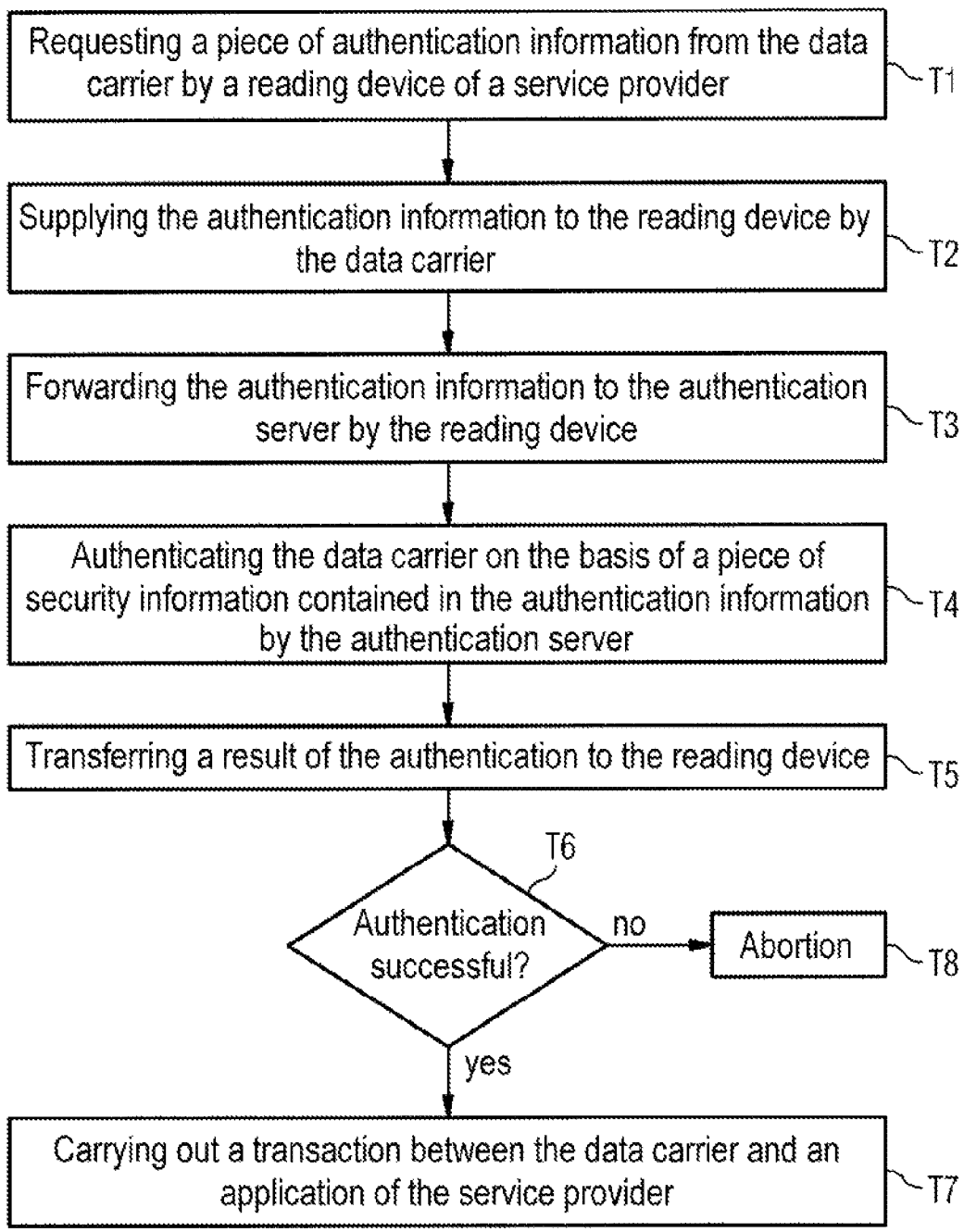

MANAGEMENT, AUTHENTICATION AND ACTIVATION OF A DATA CARRIER

BACKGROUND

The present invention relates to a method for managing a data carrier in a transaction system, an authentication server of such a system as well as the transaction system.

It is known to equip portable data carriers, such as for example chip cards or labels, with contactlessly readable markings, preferably in the form of transponders, in order to permit carrying out a transaction between the data carrier and a correspondingly adapted reading device. One possible form of such a transaction is the regulation of an access authorization, for example to a building, a traffic route or other resources. Alternative transactions are for example pure payment transactions for purchasing goods or services. For this purpose, the data carrier can be coupled to a background system, via which the payment transaction is then actually conducted.

A disadvantage of the described method is that usually every application of a service provider, for example an application permitting access to a car park of a first operator, requires a specific portable data carrier which can be employed exclusively in connection with the specific application of this service provider. When a user wishes to utilize a similar application of a second service provider, for example access to a car park of a different operator, usually a second portable data carrier is required for this purpose, which differs from the first portable data carrier.

SUMMARY

It is therefore the object of the present invention to provide a possibility permitting the utilization of one single portable data carrier in various applications, preferably also with respect to various service providers.

The present idea is based on the fundamental idea to equip the portable data carrier with a further contactlessly readable marking that can be read and processed in a simple manner by means of a portable terminal of a user of the system. Information encoded by means of the marking can be transferred then to an authentication server of the transaction system by the terminal. The authentication server is adapted to manage the data carrier in the system on the basis of the received information.

According to a first aspect, the invention relates to a method in a system which comprises at least one portable data carrier, for example a chip card or a label, an authentication server and a reading device of at least one service provider which is couplable to the authentication server via a communication network, for example the Internet. The data carrier is adapted for contactless communication with the reading device for carrying out a transaction with an application of a service provider, possibly only after activation in the system. For this purpose the data carrier comprises a security marking that is contactlessly readable by the reading device, on the basis of which marking the data carrier can be authenticated by the authentication server.

According to a preferred embodiment the method comprises the following steps:

The data carrier is equipped with a data-carrier management marking which encodes a piece of data-carrier management information. In the authentication server, the data-carrier management information is uniquely coupled to a piece of security information encoded by the security marking of the data carrier in a manner to be described in more detail hereinafter. The data-carrier management marking of the data carrier is contactlessly readable by means of a portable terminal of a user of the system, for example by means of a conventional mobile communication terminal or a smart phone.

The data-carrier management marking is read contactlessly by means of a portable terminal of a user of the system and the data-carrier management information encoded in the data-carrier management marking is transmitted to the authentication server by means of the portable terminal.

The authentication server subsequently manages the data carrier in the system employing the data-carrier management information.

The management of the data carrier in the system can comprise a step of activating the data carrier in the system. Here, the data carrier is not activated in the system, meaning that it cannot be employed for carrying out a transaction with an application of a service provider, prior to the authentication server having received the data-carrier management information encoded in the data-carrier management marking for the first time. In other words, a portable data carrier is only registered in the system after for the first time the data-carrier management marking has been read and the data-carrier management information stored therein has been transmitted to the authentication server.

The management of the data carrier in the system can further comprise a step of allocating a user to the data carrier. This step is optional, since applications are conceivable in which a user allocation to the data carrier can be omitted. Other applications, for example such applications which are connected to a payment transaction, necessarily require a specific allocation of a user to the data carrier, for example to also permit coupling account information of this user to the data carrier.

In the step of allocating, user registration data, such as for example a user name, a password, bank data of the user and the like, can be transferred to the authentication server. The user registration data are stored there along with the data-carrier management information and are allocated to the data-carrier management information by the authentication server. After completion of this step, the data carrier is considered allocated to that user who has been specified by the received user registration data.

The management of the data carrier in the system can further comprise a step of enabling an application of a service provider for the data carrier.

It should be noted here that the system is structured such that the authentication server can be connected to a plurality of service providers who offer respectively at least one application of the type indicated above, for example access control, the sale of various goods or services, and the like. Each service provider comprises at least one reading device, via which the portable data carrier can enter into communication with the service provider and/or with an application of the service provider. When the data carrier has now been activated in the system and has optionally been allocated to a specific user, various applications can be enabled for the data carrier. After enabling the data carrier for an application of a service provider the system is adapted to support the carrying out of a transaction between the application of the service provider and the data carrier. In other words, a user of the data carrier can usually utilize an application of a service provider only once it has been enabled for the specific data carrier.

The step of enabling can be carried out for example in such a manner that the authentication server displays a list of potentially selectable applications of various service providers to the user of the data carrier, for example via a suitable web interface. The user of the data carrier can then select one or several applications therefrom, which are then enabled for the specific data carrier by the authentication server. For some of these applications it may be required that the user of the data carrier specifies further user registration data, for example account information or the like, in order to permit complete and in particular automatic use of the application.

Generally, in the context of the present invention, a communication of the user of the data carrier with the authentication server can be effected via a suitable application ("app"), which the user installs on his terminal, for example his smart phone, in a conventionally known manner. Via said application the user can then log into the authentication server, specifying his user registration data. The first user registration can be supported by means of such an application as well. Alternatively or additionally, the authentication server can supply a communication interface, for example the mentioned web interface, which can be utilized by the user of the data carrier via any conventional browser (after prior login by means of the user registration data).

In all of the above-described management steps the authentication server recognizes the data carrier on the basis of the data-carrier management information that has been transferred to the authentication server by the portable terminal of the user. This data-carrier management information is stored in the authentication server, coupled to the security information of the portable data carrier, e.g. in a suitable database of the authentication server. Together with the data-carrier management information and security information also corresponding user registration data can then be stored and managed.

A user of the system can thus activate a data carrier in the system in a very simple manner, register as a user of the data carrier and enable the data carrier for various applications of various service providers. Thus a flexible and easy use of the data carrier is possible in different application contexts.

The step of enabling an application of a service provider is usually carried out by a user allocated to the data carrier, as already explained.

Alternatively, it is also possible that individual applications of specific service providers are enabled for a user of the data carrier by the respective service provider itself. For this purpose, the service provider can, in turn, read the data-carrier management marking of the data carrier contactlessly by means of a suitable reading device and transfer the data-carrier management information encoded in the data-carrier management marking to the authentication server. This usually relates to those applications that are accessible only to a specific group of users, such as for example the access to a car park of a residential complex which is intended to be accessible exclusively for residents of the residential complex. Here, the service provider is the operator of the residential estate, for example, who can enable a user to access to the car park in the specified manner after checking whether this potential user is actually a resident of the residential complex.

An application of a service provider can be enabled in particular in such a manner that a transaction between the data carrier and the application can be carried out automatically subsequently, that is without any further user interaction or the requirement to input further data or a transaction confirmation. This allows for such transactions to be carried out in a particularly easy manner.

Alternatively or additionally, it is possible to enable individual applications only basically, while for carrying out the associated transaction still a user interaction, at least a transaction confirmation or the like, is provided.

A second preferred aspect of the present invention relates to a transaction method for carrying out a transaction between a portable data carrier with an above-described security marking and a reading device of a service provider of the above-described type. This method is in principle independent of the data-carrier management method described above with reference to the first aspect of the invention. Consequently, the transaction method is described hereinafter without reference to a data-carrier management marking on the data carrier and without reference to the above-described data-carrier management steps. Following the description of the transaction method it is shown how the data-carrier management method and the transaction method can be combined advantageously.

In a first step of the transaction method, the reading device of the service provider requests a piece of authentication information comprising the security information of the data carrier from the data carrier.

The data carrier then supplies the requested authentication information to the reading device, which forwards the authentication information to the authentication server.

The authentication server authenticates the data carrier on the basis of the authentication information and transfers a result of authenticating the data carrier to the reading device.

In the case of a successful authentication of the data carrier a transaction between an application of the service provider and the data carrier can be carried out.

Accordingly, the method comprises the steps of:
requesting a piece of authentication information comprising a security identity of the data carrier from the data carrier by a reading device of the service provider;
supplying the authentication information to the reading device by the data carrier;
forwarding the authentication information to the authentication server by the reading device;
authenticating the data carrier on the basis of the authentication information by the authentication server;
ascertaining an application identity allocated to the data carrier in the service provider system by the authentication server on the basis of the security identity; and
transferring the ascertained application identity allocated to the data carrier to the reading device of the service provider system.

In the following, individual steps of the transaction method are specified by way of example with reference to preferred embodiments and variants of the transaction method. The individual variants of the steps of the method can be combined as desired, unless otherwise described. As security identity a (management-system-wide unique) piece of security information is described. As application identity a (n application-system-wide unique) public identity (or public ID) is described.

Usually, the security marking is configured as a cryptographically secured security marking, for example in the form of a transponder, which is adapted to transmit a piece of security information (SID, "secret ID") to the reading device exclusively in encrypted form. Preferably an asymmetric key architecture is utilized here. The encryption of the security information in the security marking is effected by means of a public key, the decryption by the authentication server by means of a corresponding secret key.

The reading device can recognize such a cryptographically secured security marking as cryptographically secured for example within the framework of establishing a communication connection with the data carrier, i.e. the transponder. The establishment of the communication connection can be understood here as a first partial step of a step of requesting the authentication information.

The reading device subsequently sends a corresponding command to the data carrier in order to permit a cryptographically secured transmission of the authentication information by the data carrier (for example according to ISO/IEC 29167-19). The authentication of the data carrier is usually effected by means of a challenge-response method.

For this purpose, the reading device can request the corresponding command previously from the authentication server and forward a corresponding command received from the authentication server to the data carrier, i.e. the security marking of the data carrier.

As authentication information, the data carrier can produce a response command in accordance with the protocol employed, for example in the form of a cryptogram which comprises the encrypted security information. The cryptogram can include further information that allows the authentication server to decrypt the security information.

This additional information, which relates in particular to the selection of a key required for decryption, can also be requested separately from the data carrier by the reading device and can be transmitted to the reading device by the data carrier separately from the cryptogram. The authentication information then comprises the cryptogram and the further information.

The data carrier then transmits the authentication information to the reading device, which forwards the authentication information to the authentication server.

In the authentication server, the security information contained in encrypted form in the cryptogram is decrypted and the data carrier is authenticated by the authentication server. As mentioned, the authentication method can be carried out as a challenge-response method, for example, wherein the data carrier receives a "challenge" from the authentication server, for example a random number, and "encrypts" it employing the security information.

Optionally, the authentication server can allocate a public marking relating to the data carrier, a so-called PID ("public ID"), to the decrypted security information (SID). This public marking is static and uniquely allocated to the security information (SID).

Several different public markings can be present for one data carrier. Usually exactly one public marking of the data carrier is produced (by the authentication server) for each application of a service provider for which the data carrier is enabled, said public marking, in the step of enabling the data carrier for a selected application of a service provider, then being transferred to this application In the database of the authentication server therefore one or several public markings uniquely allocated to the security information can be stored in addition to the data-carrier management information and the security information.

The authentication server subsequently transfers the result of the authentication to the reading device. On the one hand, this result can simply consist in the authentication server notifying the reading device whether it has been possible to successfully authenticate the data carrier or not.

Optionally, in the case of a successful authentication of the data carrier, the authentication server can transfer the public marking of the data carrier to the reading device which corresponds to that application of the service provider which is currently provided for carrying out a transaction with the data carrier. The reading device can send information about this application to the authentication server at any desired point in the method, for example at the outset, when requesting a command to be forwarded to the data carrier.

It should be noted here that at the time at which the data carrier establishes a communication with a reading device of a service provider, the concrete application of the service provider with which the data carrier can perform a transaction in the following usually has already been uniquely determined. In the case that several applications of the service provider are "available" via a reading device, the user can be given the option to select one of these applications.

On the basis of the result of the authentication, the reading device can then decide whether the transaction between the application and the data carrier is to be carried out. A public marking of the data carrier transferred to the reading device permits also for the reading device to uniquely authenticate the data carrier.

The data-carrier management method according to the first aspect of the invention and the transaction method according to the second aspect of the invention can be advantageously combined in such a manner that the authentication server can check in addition to authenticating the data carrier whether the corresponding data carrier has already been activated in the system. Further, the authentication server can check whether a corresponding user has already been allocated to the data carrier and whether that application which is offered by the service provider currently connected to the data carrier via the reading device has already been enabled for the specific data carrier.

In the step of transferring a result of the authentication the authentication server can therefore not only notify the reading device whether the data carrier has been successfully authenticated, but also whether the data carrier has already been activated in the system and whether the application in question has already been enabled for the data carrier.

On the other hand, the authentication server, for example when it recognizes after successful authentication of the data carrier that the application in question has not yet been enabled for the data carrier, can prompt the user of the data carrier to enable the application.

A third aspect of the present invention relates to an authentication server for a transaction system. This system comprises at least one data carrier described above with reference to the first aspect of the invention, the authentication server itself and at least one reading device of at least one service provider which is couplable to the authentication server via a communication network.

The authentication server is in particular adapted to receive from the reading device a piece of security information encoded in the security marking of the data carrier and to authenticate the data carrier on the basis of the security information. Further, the authentication server is adapted to receive from a portable terminal which is couplable to the authentication server via a communication network a piece of data-carrier management information encoded in the data-carrier management marking and to manage the data carrier in the system in the manner described above employing the data-carrier management information.

Preferably, the authentication server is adapted to store and manage in connection with the at least one data carrier, for example in a suitable database or the like, the security information, optionally a cryptographic key for decrypting a piece of security information received in an encrypted form, together with the data-carrier management information, and optionally further management data relating to the data carrier, such as user registration data of a user allocated to the data carrier or information with reference to applications of service providers enabled for the data carrier. In particular, the authentication server is adapted to support a data-carrier management method described above with reference to the first aspect of the invention and preferably also a transaction method described above with reference to the second aspect of the invention.

A fourth aspect of the present invention relates to a corresponding transaction system comprising at least one portable data carrier according to the first aspect of the invention, an authentication server according to the third aspect of the invention and at least one reading device of at least one service provider of the above-described type which is couplable to the authentication server via a communication network.

The at least one data carrier of the system is preferably configured as a chip card or a label (label, tag).

The at least one data carrier preferably comprises only the security marking. By means of the reading device of the type with which the security marking can be read, therefore no further marking can be read, in particular no application marking (public marking). Application markings (public markings) which are allocated to the data carrier are stored only centrally in the authentication server, thus not stored in the data carrier.

The security marking of the portable data carrier can preferably be formed by means of an RFID transponder, for example as an NFC transponder or as a UHF transponder.

According to a preferred variant, the transponder is adapted to encrypt a piece of security information stored in the transponder and transmit said piece of security information to a reading device of a service provider only in an encrypted from.

The data-carrier management marking of the data carrier could likewise be supplied in the form of a transponder, preferably by an NFC transponder. The data-carrier management marking is preferably configured as an optically readable marking, preferably as a bar code, particularly preferably as a QR code.

The flexibility of the system is increased in particular when the security marking and the data-carrier management information can be read from the data carrier with different means in each case or are applied to the data carrier differently. For example, a piece of data-carrier management information that is readable optically or via an NFC interface permits data-carrier management for a security marking that is readable by means of UHF (without the user being required to have a UHF reading device).

BRIEF DESCRIPTION OF THE DRAWINGS

The present invention will hereinafter be described by way of example with reference to the attached drawings. The figures are described as follows.

DETAILED DESCRIPTION OF VARIOUS EMBODIMENTS

Figure 1:
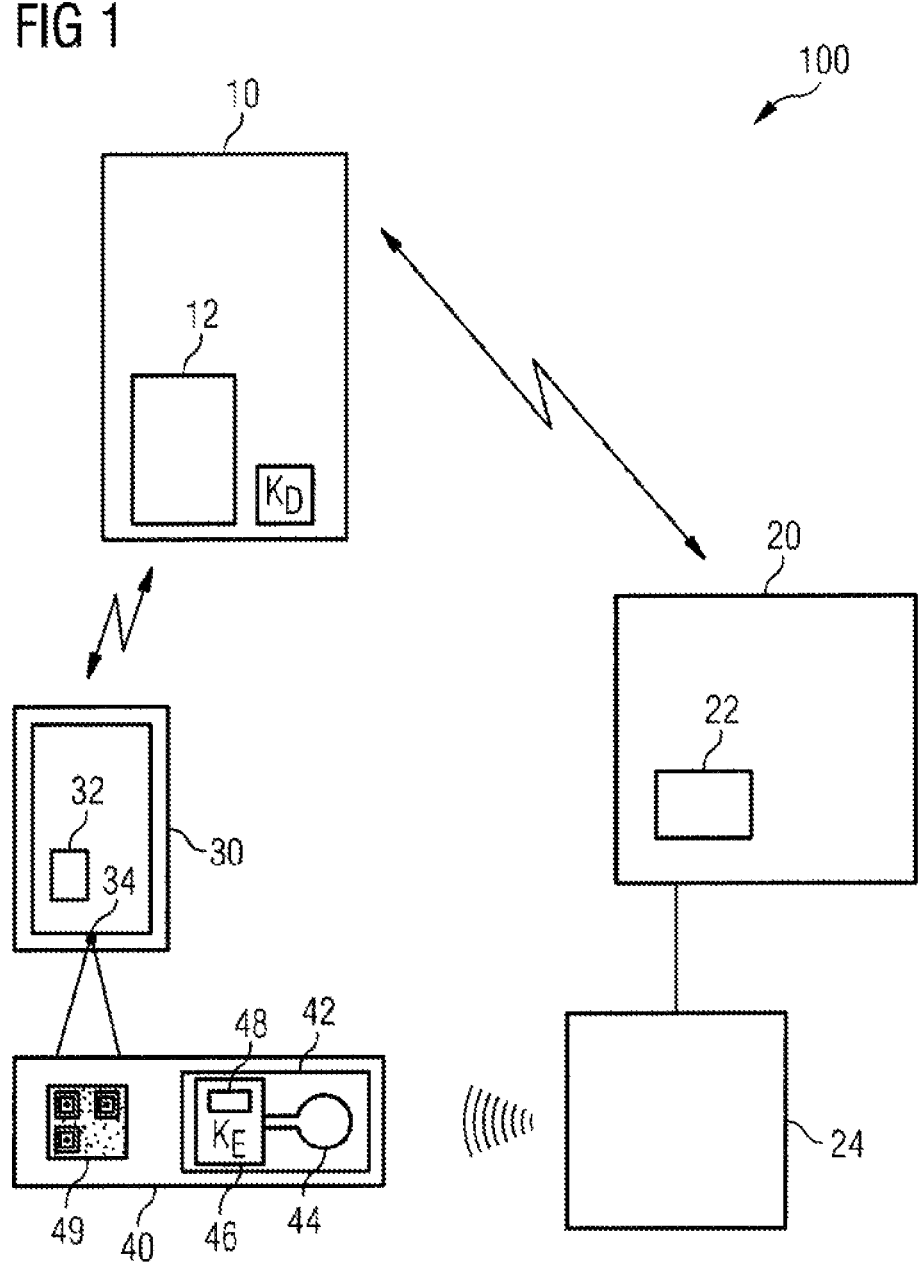
FIG. 1 Components of a preferred embodiment of a system according to the invention.

A transaction system 100 represented in FIG. 1 by way of example and schematically comprises an authentication server 10, at least one portable data carrier 40, at least one reading device 24 of a service provider 20 and at least one portable terminal 30 of a user of the system 100. As will become apparent in the following, such a system 100 will usually comprise a multiplicity of data carriers 40 and a plurality of reading devices 24 of different service providers 20.

The authentication server 10 is adapted for being coupled to the reading device 24 and/or the service provider 20 to which the reading device 24 is connected and the terminal 30 via a suitable communications network, for example the Internet. The authentication server 10 comprises a suitable memory device 12, for example a database 40, for storing and managing various data which are described in detail in the following and relate to the data carrier 40 and its management in the system 100. The function and operation method of the authentication server 10 will become apparent in the following with reference to the methods according to FIGS. 2 and 3.

The data carrier 40 comprises a security marking 42. Said marking is configured as a transponder in the example shown. Depending on the application, an NFC transponder, a UHF transponder or the like can be utilized. The transponder 42 comprises a transponder chip 46 and an antenna 44. In the transponder chip a piece of security information (SID) 48 and a public key $K_E$ for encrypting the security information 48 are stored. The transponder chip 46 is adapted to encrypt the security information 48 by means of the key $K_E$ and to transmit said security information to a reading device 24 only in an encrypted form.

The data carrier 40 further comprises a data-carrier management marking 49. The data-carrier management marking 49 is adapted to be read contactlessly by means of the portable terminal 30. In principle, the data-carrier management marking 49 can be configured as a transponder as well, for example as an NFC transponder. However, preferably the data-carrier management marking 49, as represented in FIG. 1, is configured as an optically readable marking, particularly preferably as a QR code. Reading and evaluating such a marking can be effected in a simple manner by means of a conventional smart phone camera and a corresponding evaluation application.

The data carrier 40 is registered in the authentication server 10 of the system 100. For this purpose, the authentication server 10 stores the security information 48 of the data carrier 40 together with the data-carrier management information encoded in the data-carrier management marking 49. In this manner, the authentication server 10 can uniquely identify the data carrier 40 in each case and effect an allocation between the two pieces of information upon receipt of one of these two pieces of information, i.e. the security information 48 or the data-carrier management information.

As already mentioned, the portable terminal 30, as shown in FIG. 1, can be configured as a smart phone. The terminal 30 is adapted to read the data-carrier management marking 49 of the data carrier 40, optically in the example shown, by means of a camera 34 and a corresponding evaluation application 32. In the case where the data-carrier management marking 49 is configured as an NFC transponder, an NFC enabled smart phone or the like can be employed as the terminal 30. The terminal 30 does not need to be able to read the security marking 42 of the data carrier 40.

The data carrier 40, i.e. more exactly the security marking 42 of the data carrier 40, can be connected to an application 22 of the service provider 20 via the reading device 24 for carrying out a transaction, as will be in the following with reference to FIG. 3.

For activating the data carrier 40 in the system, allocating it to a user and enabling it for the application 22, a data carrier management method can be used, as will be described in the following with reference to FIG. 2.

In a first step S1, the data carrier 40 is equipped with a data-carrier management marking 49, for example the above described QR code. The data-carrier management marking 49 in this case is applied to the data carrier 40 or incorporated in the data carrier 40 such that it can be read contactlessly by the terminal 30 of the user.

The data-carrier management marking 49 encodes a piece of data-carrier management information, for example a character string uniquely allocated to the data carrier. As already mentioned, the data-carrier management information of the data carrier 40 is uniquely coupled to the security information 48 of the data carrier 40 in the authentication server 10.

In step S2, the data-carrier management marking 49 is read contactlessly by means of a portable terminal 30 of a user of the system 100. In the example shown, the user will read the QR code 49 by means of the smart phone 30 and the camera 34 and forward the data-carrier management information stored therein to the authentication server 10 in step S3. In the data-carrier management marking 49 for example an Internet address of the authentication server 10 can be stored in addition to the data-carrier management information, in order to be able to automate the step S3 of transfer.

In step S4 the authentication server 10 now manages the data carrier 40 in the system 100 employing the data-carrier management information received in step S3.

Figure 2:
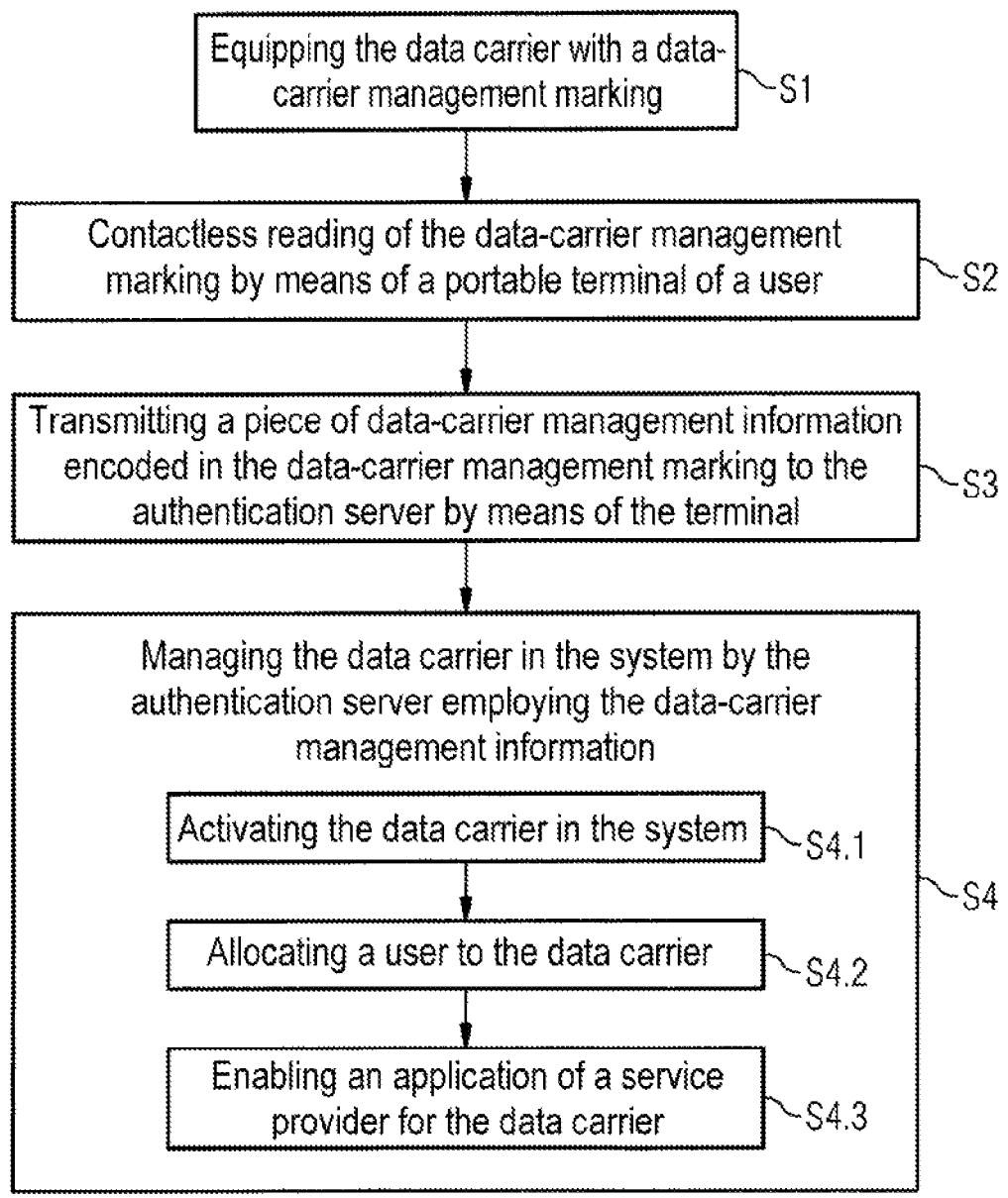
FIG. 2 steps of a preferred embodiment of a method for managing a data carrier in the system according to FIG. 1 and FIG. 3 steps of a preferred embodiment of a transaction method in the system according to FIG. 1.

The management of the data carrier 40 in the system 100 can relate to various aspects that are indicated in FIG. 2 in the partial steps S4.1, S4.2 and S4.3.

In step S4.1, the data carrier 40 is activated in the system 100. In principle, a data carrier 40 is adapted to be employed in the system 100 in the manner described with reference to FIG. 3. However, a one-time activation of the data carrier 40 is usually required for this purpose. Such an activation can be effected by the authentication server 10 once receiving the data-carrier management information encoded in the data-carrier management marking 49 from the terminal 30. From this point, the authentication server 10 can record the data carrier 40 as activated in the system 10 as a data-carrier management step. It is possible that the authentication server 10 also reverses such an activation of the data carrier 40, for example when a misuse of the data carrier 40 is present or is at least suspected.

A further data-carrier management step indicated with reference to step S4.2 comprises the allocation of a user to the data carrier 40. Applications are conceivable in which such a user allocation to the data carrier, which does not exist a priori, is not required. However, usually a one-time allocation of a user to the data carrier 40 will be effected. Here, the user registers with the authentication server 10 as the user of the data carrier 40. Once such a registration has been concluded, no other user can register as the user of the data carrier 40, meaning that the data carrier 40 is uniquely allocated to that user who was the first to register. In principle, it can be provided that a once registered user is changed and a new user is entered. It can also be provided that a limited number of users, i.e. more than one user, can be registered per data carrier; if so, preferably with the same password in order to prevent misuse.

Also for allocating a user to the data carrier 40, the data-carrier management marking 49 is read by means of the terminal 30 and the data-carrier management information encoded therein is transmitted to the authentication server 10 in the manner described above. Subsequently, when the authentication server 10 has identified the data carrier 40 on the basis of the data-carrier management information, user registration data of the user can be transferred to the authentication server 10 by means of the terminal 30. Such user registration data can comprise a user name and password of the user in particular. In the following the user can thus log into the authentication server 10 for the further management of the data carrier 40 and for inputting further data relating to the use of the data carrier 40 in the system, such as for example for inputting or changing account information for permitting an automatic carrying out of a payment transaction by means of the data carrier 40 or the like.

A further management step relates to enabling an application of a service provider 20 for the data carrier 40, as indicated in step S4.3. Before a user can employ an application 22 of a service provider 20 by means of the data carrier 40, for example the application 22 shown in FIG. 1, i.e. carry out a transaction with the application 22 by means of the data carrier 40, the application 22 in question has to be enabled for the data carrier 40. To permit such enabling, the user of the data carrier 40, again by reading out the data-carrier management marking 49 by means of the terminal device 30 and by transmitting the data-carrier management information encoded in the data-carrier management marking 49 to the authentication server 10, can quasi carry out a login of the data carrier 40 in the authentication server 10. The authentication server 10 then offers the possibility of enabling individual applications 22, which are displayed to the user of the data carrier 10 in the form of a list, for example. The user of the data carrier 40 can select individual applications from this list, which are then enabled by the authentication server 10 for use by the data carrier 40. In principle, also such applications can be provided which can be employed by a data carrier 40 activated in the system without prior enabling.

It is understood that after a one-time readout of the data-carrier management marking 49 and transfer of the data-carrier management information encoded therein, quasi within one "session", a plurality of steps S4.1, S4.2 and S4.3 can be carried out without having to repeat the readout and transfer each time before carrying out the respective one of the steps. However, when the data communication between the terminal device 30 and the authentication server 10 has been concluded once, it is required for carrying out the step S4.3, for example, again or for the first time that the steps S2 and S3 are carried out again beforehand.

With reference to FIG. 3, a transaction method will be described in the following by way of example, i.e. a method for carrying out a transaction between the data carrier 40 and an application 22 of the service provider 20. Such a method is in principle independent of a data-carrier management method according to FIG. 2.

In step T1 a reading device 24 of a service provider 20, upon detecting a portable data carrier 40 in the response range of the reading device 24, prompts the data carrier 40 to supply a piece of authentication information. The reading device 24 can be adapted here to detect whether the data carrier 40 is a secure data carrier in the manner that the security marking 42 of the data carrier 40 supplies a piece of security information 48 of the data carrier 40, on the basis of which the authentication server 10 can authenticate the data carrier 40, exclusively in an encrypted form. In this case, the reading device 24 can request for example from the authentication server 10 a corresponding command which permits an authentication method employing a piece of security information 48 transferred in an encrypted form. In connection with the present invention, a protocol in accordance with ISO/IEC 29167-19 can be employed for this purpose for example, wherein a special challenge-response method is utilized for the data carrier's authentication. The security information 48 is defined in this case as a marking of a length of eight bytes.

In step T2, the data carrier 40 supplies a corresponding piece of authentication information to the reading device 24. This authentication information comprises the security information 48 in particular, as mentioned above, preferably in encrypted form. For this purpose, the security marking 42 comprises an encryption key $K_E$ for encrypting the security information 48. The key $K_E$ can be a public key of an asymmetric key pair for example, wherein the authentication server 10 comprises a secret key $K_D$ forming part of the key pair (cf FIG. 1), in order to be able to decrypt the encrypted security information 48 again.

The data carrier 40 can produce the authentication information as a cryptogram for example, in accordance with the above-described standard. In particular, the authentication information includes a further piece of information which permits the authentication server 10 to determine the secret key $K_D$ required for decrypting the encrypted security information. This additional information can be part of the cryptogram. Alternatively, the reading device 24 can request such a further piece of information from the data carrier 40 separately and add it to the authentication information. An example of such a further piece of information is a specific group identity defining a group which to which the data carrier 40 is allocated. For each of these groups there exists a uniform public key $K_E$ and a corresponding secret key $K_D$.

In step T3, the reading device 24 forwards the authentication information received from the data carrier 40 to the authentication server 10.

Said authentication server in step T4 authenticates the data carrier 40 on the basis of the security information 48 contained in the authentication information. For this purpose, the authentication server 10 decrypts the encrypted security information 48 contained in the authentication information by means of the secret key $K_D$. Employing a challenge-response method indicated above, in this manner a unique authentication of the data carrier 40 can be effected in a manner that is known per se.

Optionally, after successful authentication of the data carrier 40, the authentication server 10 can now uniquely allocate a public marking (PID) of the data carrier 40 to the security information 48 of the data carrier 40. It can be provided here that the authentication server 10 produces a separate public marking of the data carrier 40 for each application 22 of a service provider 20 enabled for the data carrier 40, said separate public marking being allocated to the security information 48 of the data carrier 40, and transfers it to the respective application of the service provider. Using the corresponding public marking, the application itself can then uniquely authenticate the data carrier 40.

The format of such a public marking can in principle be freely selected per application 22 and can be adapted to the requirements of the application 22. On the basis of such a public marking, an application 22, if required, can "recall" a user of the data carrier 40 in the course of a transaction, for example in a toll application with a plurality of toll booths. The true identity of the user of the data carrier 40, which is usually not known to the service provider 20, can remain hidden here. The transmission of the public marking instead of the security marking 48 from the authentication server 10 to the reading device 24 offers the further advantage that the reading device 24 then does not have both, the plain text (security marking) and the cryptogram (encrypted security marking), and could possibly draw conclusions about the encryption on the basis thereof.

In step T5, the authentication server 10 transfers a result of authenticating to the reading device 24, that is in particular the fact whether the data carrier 40 has been successfully authenticated, and if so, optionally, additionally a public marking of the data carrier 40 which is allocated to that application 22 of a service provider 20 with which the data carrier 40 now intends to carry out a transaction. As indicated above, the specific application 22 is known to the authentication server 10.

In step S5, the authentication server 10 transfers a result of authenticating to the reading device 24, that is in particular the fact whether the data carrier 40 has been successfully authenticated, and if so, optionally, additionally a public marking of the data carrier 40 which is allocated to that application 22 of a service provider 20 with which the data carrier 40 now intends to carry out a transaction. As indicated above, the specific application 22 is known to the authentication server 10.

In step T6, the reading device 24 checks the results received, meaning that it checks whether the data carrier 40 has been uniquely authenticated by the authentication server 10 and, optionally, whether the received public marking of the data carrier 40 matches the public marking known for the application. In the event that there result contradictions with respect to the public marking or when the authentication has failed in general, the method is aborted, as specified with reference to step T8.

In the case of a successful authentication, in step T7 a transaction is carried out between the data carrier 40 and the application 22 of the service provider 20.

Generally it can be determined that the authentication server 10 thus provides a number of advantageous functionalities. On the one hand, it can check the authenticity of the data carrier 40 for various applications 22 of various service providers 20, while the data carrier 40 can remain anonymous with respect to the service providers. The authentication server 10 can also determine whether the data carrier is 40 has already been enabled for a specific application 22. Further, the authentication server 10 can operate as a clearing instance, since user registration data corresponding to the data carrier 40 can be managed, and can support a settlement of various applications for various service providers, for example.

The provision of the data-carrier management marking 49 on the data carrier 40 permits to a user of the data carrier 40 a very easy management of the data carrier 40 in the system 100. No new technical means are required for this purpose; a conventional smart phone, which is employed by the user in daily life anyway, is fully sufficient for carrying out the substantial data-carrier management steps, namely the activation of the data carrier 40 in the system 100, the allocation of a user to the data carrier 40 as well as the enabling of individual applications 22. In this manner it becomes possible for the first time to supply one and the same portable data carrier 40 which can cooperate contactlessly with various applications 22 of various service providers 20.

It is understood that a user can employ different portable data carriers 40, for example once in the form of a chip card, once in the form of a label. The authentication server 10 can of course also manage different data carriers 40 for a user.

The invention claimed is:

1. A method in a system comprising at least one portable data carrier, an authentication server and at least one reading device of at least one service provider which is couplable with the authentication server, wherein the data carrier is adapted to communicate contactlessly with the reading device and comprises a security marking that can be read contactlessly by the reading device, on the basis of which security marking the data carrier can be authenticated by the authentication server, comprising the steps of:
- equipping the data carrier with a data-carrier management marking, which encodes a piece of data-carrier management information and which is contactlessly readable by means of a portable terminal of a user of the system;
- contactlessly reading the data-carrier management marking by means of a portable terminal and transferring the data-carrier management information encoded in the data-carrier management marking to the authentication server;
- managing the data carrier in the system employing the data-carrier management information including a step of allocating the user to the data carrier,
- wherein, in the step of allocating, user registration data of a user can be transferred to the authentication server and allocated to the data-carrier management information, and
- wherein the authentication server produces a public marking of the data carrier, said public marking being allocated to the data-carrier management information, and transfers said public marking to the portable terminal;
- wherein the management of the data carrier in the system comprises a step of activating the data carrier in the system,
- wherein the data carrier is activated in the system after the authentication server having received the data-carrier management information encoded in the data-carrier management marking.

2. The method according to claim 1, wherein the management of the data carrier in the system comprises a step of enabling an application of a service provider for the data carrier,
- wherein the system is preferably adapted to support the carrying out of a transaction between the application of the service provider and the data carrier after the application has been enabled.

3. The method according to claim 2, wherein the step of enabling an application of a service provider is carried out by the user allocated to the data carrier.

4. The method according to claim 2, wherein the step of enabling an application of a service provider is carried out by the service provider itself, for which purpose the service provider in turn can read the data-carrier management marking contactlessly by means of a suitable reading device and can transfer the data-carrier management information encoded in the data-carrier management marking to the authentication server.

5. The method according to claim 2, wherein the application is enabled in such a manner that a transaction between the data carrier and the application can be carried out automatically.

6. The method according to claim 1, wherein the further steps of:
- requesting a piece of authentication information comprising the security information of the data carrier from the data carrier by the reading device of the service provider;
- supplying the authentication information to the reading device by the data carrier;
- forwarding the authentication information to the authentication server by the reading device;
- authenticating the data carrier on the basis of the security information contained in the authentication information by the authentication server;
- transferring a result of authenticating the data carrier to the reading device; and
- upon successful authentication of the data carrier, carrying out a transaction between an application of the service provider and the data carrier.

7. An authentication server for a system comprising at least one portable data carrier, the authentication server and at least one reading device of at least one service provider which is couplable to the authentication server via a communication network,
- wherein the data carrier is adapted to communicate contactlessly with the reading device and comprises a security marking that can be read contactlessly by the reading device and a data-carrier management marking that can be read contactlessly by means of a portable terminal,
- wherein the authentication server is adapted,
- to receive a piece of security information encoded in the security marking from the reading device and to authenticate the data carrier on the basis of the piece of security information, and is adapted
- to receive a piece of data-carrier management information encoded in the data-carrier management marking from a terminal and to manage the data carrier in the system employing the piece of data-carrier management information including a step of allocating a user to the data carrier,
- wherein, in the step of allocating, user registration data of a user can be transferred to the authentication server and allocated to the data-carrier management information, and
- wherein the authentication server produces a public marking of the data carrier, said public marking being allocated to the data-carrier management information, and transfers said public marking to the terminal and/or the reading device;
- wherein the management of the data carrier in the system comprises a step of activating the data carrier in the system,
- wherein the data carrier is activated in the system after the authentication server having received the data-carrier management information encoded in the data-carrier management marking.

8. The authentication server according to claim 7, wherein the authentication server is adapted to store and manage the security information together with the data-carrier management information related to the least one data carrier, and to support a method, comprising the steps of:
- equipping the data carrier with a data-carrier management marking, which encodes a piece of data-carrier management information and which is contactlessly readable by means of a portable terminal of a user of the system;

contactlessly reading the data-carrier management marking by means of a portable terminal and transferring the data-carrier management information encoded in the data-carrier management marking to the authentication server;

managing the data carrier in the system employing the data-carrier management information.

9. A system comprising:

at least one portable data carrier;

an authentication server; and at least one reading device of at least one service provider which is couplable to the authentication server via a communication network;

wherein the data carrier is adapted to communicate contactlessly with the reading device and comprises a security marking that can be read contactlessly by the reading device and a data-carrier management marking that can be read contactlessly by means of a portable terminal; and wherein the authentication server is adapted, to receive a piece of security information encoded in the security marking from the reading device and to authenticate the data carrier on the basis of the piece of security information, and is adapted to receive a piece of data-carrier management information encoded in the data-carrier management marking from the terminal and to manage the data carrier in the system employing the piece of data-carrier management information including a step of allocating a user to the data carrier, wherein, in the step of allocating, user registration data of a user can be transferred to the authentication server and allocated to the data-carrier management information, and wherein the authentication server produces a public marking of the data carrier, said public marking being allocated to the data-carrier management information, and transfers said public marking to the reading device and/or the portable terminal;

wherein the management of the data carrier in the system comprises a step of activating the data carrier in the system, wherein the data carrier is activated in the system after the authentication server having received the data-carrier management information encoded in the data-carrier management marking.

10. The system according to claim 9, wherein the data carrier is configured as a chip card or as a label.

11. The system according to claim 9, wherein the security marking of the data carrier is configured as a radio-frequency identification (RFID) transponder.

12. The system according to claim 11, wherein the transponder is adapted to encrypt a piece of security information stored in the transponder and to transmit said piece of security information to a reading device only in an encrypted form.

13. The system according to claim 9, wherein the data-carrier management marking is configured as an optically readable marking.

14. The system according to claim 9, wherein the security marking of the data carrier is configured as a near-field communication (NFC) transponder or as an ultra high frequency (UHF) transponder.

* * * * *